United States Patent [19]
Olson

[11] Patent Number: 5,953,390
[45] Date of Patent: Sep. 14, 1999

[54] DEVICE FOR INDUCING A WINK IN A TELEPHONE SYSTEM

[75] Inventor: Gregory David Olson, Dallas, Tex.

[73] Assignee: Southwestern Bell Telephone Company, San Antonio, Tex.

[21] Appl. No.: 08/829,184

[22] Filed: Mar. 31, 1997

[51] Int. Cl.$^6$ .................................................. H04M 1/24
[52] U.S. Cl. ........................... 379/9; 379/234; 379/21; 379/26; 379/29
[58] Field of Search .............................. 379/1, 9, 15, 17, 379/21–23, 27, 29, 198, 231, 233–234, 240

[56] References Cited

U.S. PATENT DOCUMENTS

| | | |
|---|---|---|
| 4,398,064 | 8/1983 | Formosa, Jr. . |
| 4,741,016 | 4/1988 | Callahan . |
| 4,794,632 | 12/1988 | Burton et al. . |
| 4,843,620 | 6/1989 | Hagedorn ................................. 379/21 |
| 4,914,690 | 4/1990 | Hagedorn ............................... 379/233 |
| 4,930,153 | 5/1990 | Hagedorn ............................... 379/233 |
| 4,991,196 | 2/1991 | Krebs . |
| 5,218,616 | 6/1993 | Stephens . |
| 5,276,727 | 1/1994 | Kim et al. . |

*Primary Examiner*—Curtis A. Kuntz
*Assistant Examiner*—Duc Nguyen
*Attorney, Agent, or Firm*—Greenblum & Bernstein, P.L.C.

[57] ABSTRACT

The present invention is directed to an adaptor for simulating the presence of a PBX device in a telephone network. The adaptor connects to an external line from the central office, and a test set. When the central office seizes the line, the adaptor responds by inducing a wink. The central office, believing that it has received an authentic PBX response, sends data to the PBX site responsive to the wink. The adaptor relays these signals to the external test set for analysis.

18 Claims, 4 Drawing Sheets

DEVICE FOR INDUCING A WINK IN A TELEPHONE SYSTEM

BACKGROUND OF THE INVENTION

1. Field of the Invention

The present invention relates to a device which can produce a wink in a telephone system. More specifically, the present invention is directed towards a device which, upon seizure of a telephone line by a central office, simulates the presence of a PBX unit by producing a wink to acknowledge the seizure.

2. Description of the Prior Art

Figure 1:
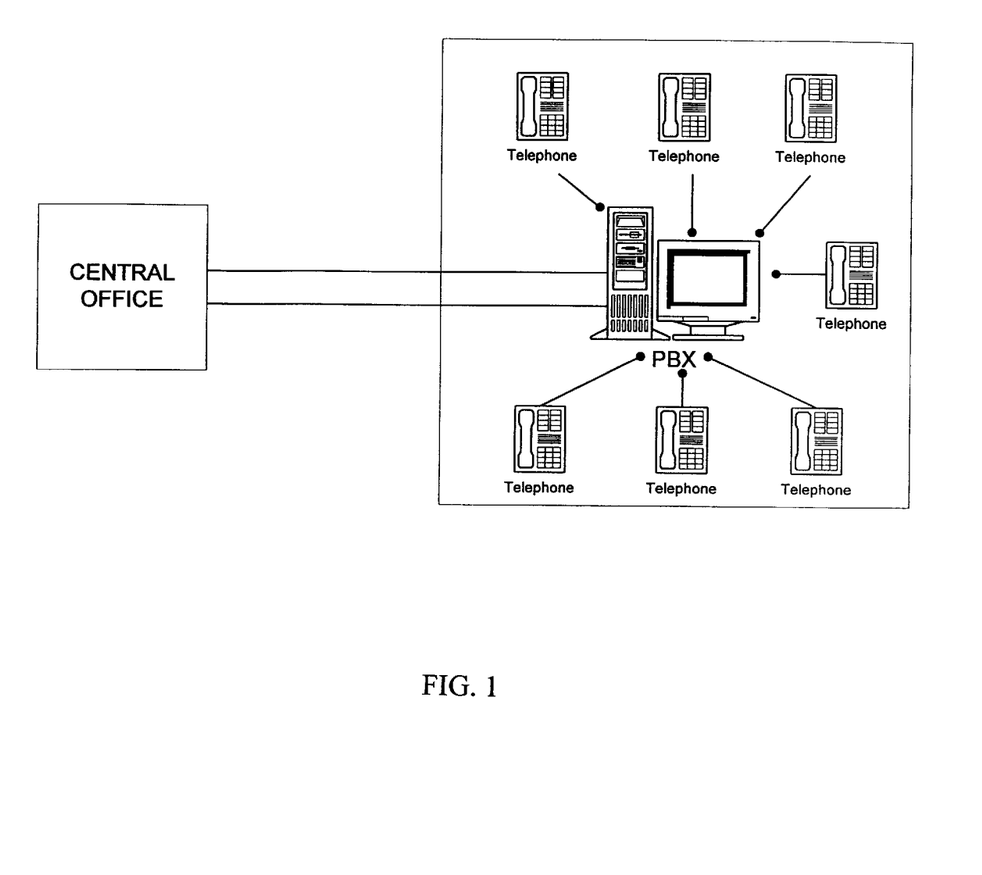
FIG. 1 is a schematic drawing of a PBX system.

When companies set up a telephone system which requires multiple extensions, it is not uncommon to reserve a block of telephone numbers from the local telephone provider, e.g., all numbers from 555–1000 through 555–1250. In this setup, the provider routes all calls to those numbers to an on-site PBX (Private Branch exchange). The PBX transfers any calls to the appropriate station (phone) inside the company which are connected to the PBX. A simplified block diagram of such a PBX system is shown in FIG. 1.

The system shown in FIG. 1 operates as follows. When an outside party calls one of the dedicated numbers, the telephone company central office seizes the line connected to the PBX unit; as known to those in the art, the seizure is induced by shorting the Tip and Ring lines. The PBX acknowledges the seizure by inducing a wink, in which the polarity of the two lines of the PBX are reversed. The central office acknowledges the wink by sending the last three or four digits of the phone number (depending on the amount of reserved lines) to the PBX. The PBX then routes the call to the dialed station.

A drawback of the PBX system described above is that if the central office does not receive a wink from the PBX system, it will not transmit the digits, or other data. Thus, if the PBX has not yet been installed, or is otherwise inoperable, a wink cannot be induced from the PBX site. Further, since PBX's are large, bulky, and expensive, it is not practical for installers and/or repair crews to carry a spare PBX as part of their equipment. Accordingly, the prior art to date does not provide any device which can simulate a PBX wink at a remote location.

SUMMARY OF THE INVENTION

It is accordingly an object of the present invention to overcome the drawbacks of the prior art.

It is accordingly a further object of the invention to provide a portable unit which can acknowledge receipt of a line seizure by emitting a wink.

To this end, the present invention is directed toward an adaptor ("the WINK adaptor") which can be connected into a communication system to simulate the presence of a PBX such that the central office will respond to the WINK adaptor as if an operational PBX device is connected to the telephone line.

According to an embodiment of the invention, there is provided an adaptor for simulating the presence of a PBX device, including a connecting mechanism connects to an external line. A detecting mechanism detects a seizure of the external line. An inducing mechanism induces a wink responsive to the seizure. A linking mechanism links to a test apparatus. A routing mechanism routes an AC component of signals received over the external line to the linking mechanism.

In a feature of the above embodiment, the inducing mechanism includes a switch which connects two voltage potentials to the connecting mechanism. The switch reverses a polarity of the two voltage potentials relative to the linking mechanism to generate the wink responsive to the seizure.

In a further feature of the above embodiment, the detecting mechanism includes a first RC circuit having at least one resistor and one capacitor.

In a further feature of the above embodiment, the inducing mechanism includes a second RC circuit connected to the switch, the second RC circuit having at least one resistor and at least one capacitor.

According to another embodiment of the invention, there is provided an adaptor for simulating the presence of a PBX device, including first and second inputs for connection to an external line. A relay having a coil connects the first and second inputs to first and second voltage terminals when the coil is inactive, and connects the second and first inputs to the first and second voltage terminals to induce a wink when the coil is energized. A first circuit, including at least one resistor and at least one capacitor, detects a seizure of the external line. A second circuit, connected to the coil, has at least one capacitor and at least one resistor. The coil is energized to induce a wink following a delay after the external line is seized. The relay being is released to terminate the wink when a charge in the at least one capacitor of the second circuit decays below a value necessary to maintain the coil in an energized state.

According to a feature of the above embodiment, the first and second circuits have first and second time constants, respectively. The delay is governed by the following equation:

$$PT1 + PT2 + PCoil > IND1$$

where PT1 represents the first time constant, PT2 represents the second time constant, PCoil represents a time which the relay physically requires to induce the wink, and IND1 is a minimum time established by industry standards.

According to a feature of the above embodiment, the at least one capacitor of the second circuit and an internal resistance of the relay establish a third time constant, a duration of the wink being given by the following equations:

$$IND2 < \text{wink} < IND3 \quad \text{wink} = K\ (PT3)$$

where PT3 is represents the third time constant, IND2 and IND3 represent industry standards for the minimum and maximum length of a wink, and K is logarithmically proportional to a time required for the at least one capacitor of the second circuit to discharge from its peak charged value.

According to a further feature of the above embodiment, the first circuit includes a transistor, the transistor being ON during a period between saturation of the transistor and when the at least one capacitor of the first circuit approaches a maximum charge, and wherein the peak charged value is based on the period.

According to a still further feature of the above embodiment, an indication circuit, connected between the first and second voltage terminals, indicates when the first and second voltage terminals are connected to a power source.

According to a still further feature of the above embodiment, a seizure detector circuit indicates when the external line is seized.

According to a still further feature of the above embodiment, first and second outputs are capable of relaying signals from the external line to a testing device, the first and second outputs being coupled to the first and second inputs through at least one transformer.

According to a still further feature of the above embodiment, a connector, coupled to the first and second inputs, connects to a portable telephone.

According to a still further feature of the above embodiment, IND1 is 100 ms, IND2 is 140 ms, IND3 is 290 ms, and K is approximately 3.2.

According to a still further feature of the above embodiment, a switch selectively shorts the first and second inputs.

According to yet another embodiment of the invention, there is provided an adaptor for simulating the presence of a PBX device. First and second inputs connect to an external line. A relay having a coil connects the first and second inputs to a ground and a negative voltage when the coil is inactive, and connects the second and first inputs to the ground and the negative voltage to induce a wink when the coil is energized. A transistor has an emitter connected to the negative voltage, and a base connected to the negative voltage through a first RC circuit and at least one resistor. The coil connects to a second RC circuit. A collector of the transistor connects to the second RC circuit.

According to a feature of the above embodiment, the transistor saturates responsive to a short of the first and second inputs to turn the transistor ON. The second RC circuit charges responsive to the transistor turning ON. the coil energizes responsive to the second RC circuit reaching a predetermined level of charge. The transistor turns OFF when a charge of the first RC circuit approaches a maximum value. The second RC circuit discharges current through the coil responsive to the transistor turning OFF. The coil returns to an inactive state when a charge of the second RC circuit drops below a predetermined value.

According to a further feature of the above embodiment, the first and second RC circuits have first and second time constants. The coil induces a wink after an elapsed time following the short, the elapsed time being governed by the following equation:

$$PT1+PT2+PCoil>100 \text{ ms}$$

where PT1 represents the first time constant, PT2 represents the second time constant, and PCoil represents a time which the relay physically requires to induce the wink.

According to a still further feature of the invention, the at least one capacitor of the second circuit and an internal resistance of the relay establish a third time constant, a duration of the wink being given by the following equations:

$$140 \text{ ms}<wink<290 \text{ ms wink} =K \text{ } (PT3)$$

where PT3 represents the third time constant, and K is logarithmically proportional to the time required for the at least one capacitor of the second circuit to discharges below the predetermined value.

According to a still further embodiment of the invention, a seizure detector circuit indicates when a seizure occurs on the external line.

According to a still further embodiment of the invention, first and second outputs can relay signals from the external line to a testing device. The first and second outputs are coupled to the first and second inputs through at least one transformer.

According to a still further embodiment of the invention, a connector, coupled to the first and second inputs, connects to a portable telephone.

According to a still further embodiment of the invention, a switch selectively shorts the first and second inputs.

DETAILED DESCRIPTION OF THE PREFERRED EMBODIMENTS

Figure 2:
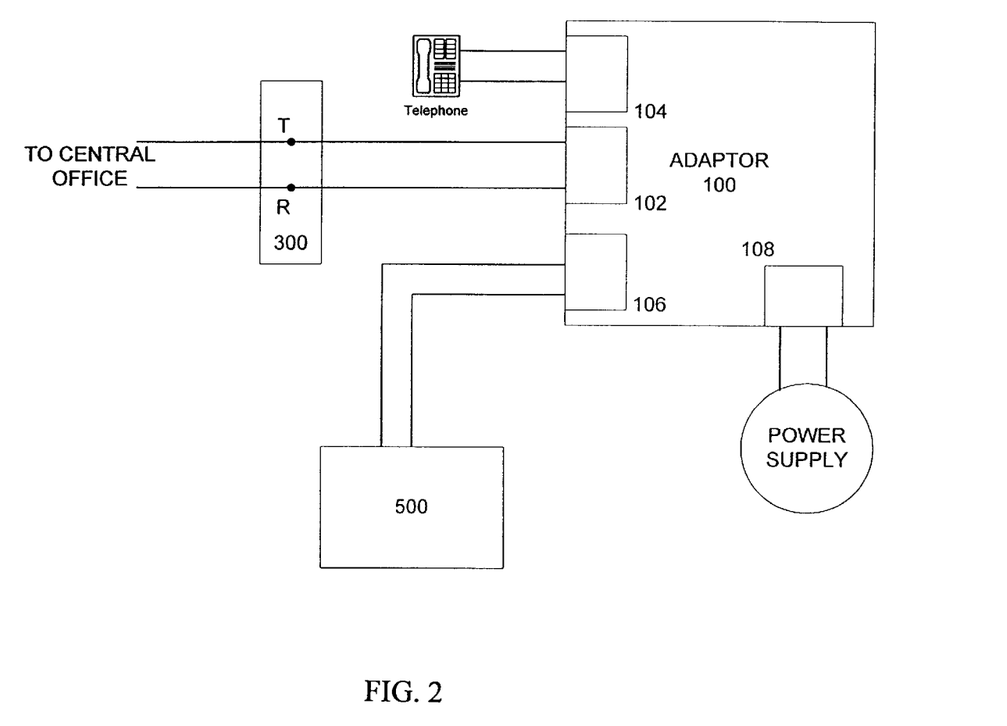
FIG. 2 is a block diagram of the WINK adaptor under operating conditions.

The WINK adapter 100 is shown in its operating environment in FIG. 2. Tip and Ring lines are represented by T and R, respectively. A technician connects WINK adaptor 100 to a local demarcation connection (DEMARC) 300 through T and R terminals at 102, which links WINK adaptor 100 to the central office (through a local facility, if necessary). An input terminal 104 serves as a connection to a portable telephone, which permits communication from the site of local connector 300 to the central office. An output terminal 106 connects to an external device 500, typically a transmission test set. A power supply 108, preferably a 110 AC/48 DC converter which mounts into a standard electrical outlet, powers WINK adaptor 100.

As discussed more fully below, when inactive, WINK adaptor 100 connects −48 volts to the Ring terminal and grounds the Tip terminal at interface 102. When the central office seizes the line by shorting the Tip and Ring lines, WINK adaptor 100 responds by reversing the polarity of the lines, i.e., WINK adaptor 100 "winks" by connecting −48 volts to the Tip terminal and grounds the Ring terminal at interface 102. Although no PBX unit is actually present, the central office interprets the wink as a standard PBX response, and accordingly transmits data as if a PBX unit were actually at the location of WINK adaptor 100.

Figure 3:
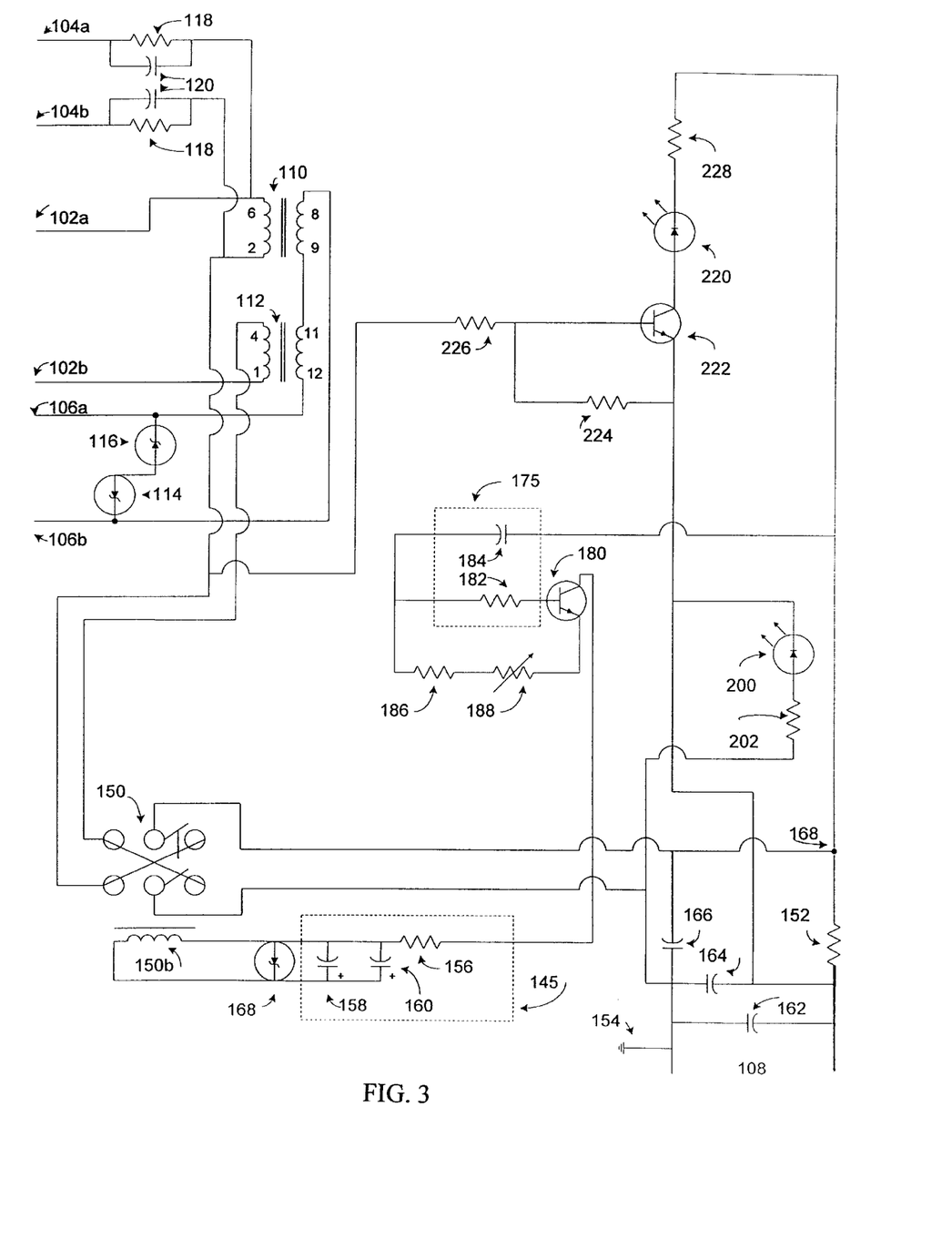
FIG. 3 is a schematic diagram of the first embodiment of the WINK adaptor.

A schematic diagram of a first embodiment of WINK adaptor 100 is shown in FIG. 3. A Tip terminal 102a connects to a node 6 of a transformer 110, while a Ring terminal 102b connects to a node 1 of transformer 112. Tip and Ring terminals 104a and 104b also connect to nodes 6 and 1, respectively. Nodes 9 and 11 of transformers 110 and 112 connect together, while nodes 8 and 12 connect to Tip and Ring terminals 106a and 106b of interface 106.

Tip and Ring terminals 102a connect through transformers 110 and 112 to two terminals of double-prong-double-throw relay switch 150, which includes a coil 150b. The opposite two terminals of switch 150 connect to a ground 154 and a negative terminal of power supply 108 though a resistor 152. Coil 150b connects to an RC circuit 145, which includes a resistor 156 and capacitors 158 and 160.

A transistor 180 is the circuit element which, as discussed below, actively detects a line seizure. The collector of transistor 180 connects to resistor 156, while the emitter connects to the negative terminal of power supply 108. The base of transistor 180 also connects to the negative terminal of power supply 68 through resistor 152, a capacitor 184, and a resistor 182. Resistors 186 and 188 connect the emitter of transistor 180 to its base through resistor 182. Resistor 182 and capacitor 184 form an RC circuit 175.

In an inactive state, switch 150 connects tip terminal 102a to ground 154, and ring terminal 102b to the negative terminal of power supply 108. Since there is no closed circuit between terminals 102a and 102b, no significant current flows from power supply 108. Further, the base and emitter of transistor 180 are at the same voltage (−48 volts) such that transistor 180 is OFF.

When the central office seizes the line, it shorts terminals 102a and 102b, closing the circuit between the terminals of power supply 108 through resistor 152. Current flows through the circuit, including resistor 152, and resistances from the external trunk (typically, anywhere from 300–600 Ohms) and transformers 110 and 112 (50–100 Ohms) These resistances split the voltage such that the voltage at node 168 increases from the open circuit voltage of −48 V to a closed circuit value of between −20 V and −40 V.

Since the base of transistor 180 connects to node 168 (through resistor 182 and capacitor 184), the voltage increase at node 168 also increases (1) the voltage of capacitor 169 and (2) the base voltage of transistor 180 relative to its emitter voltage (i.e., the base voltage increases to between −20 V and −40 V, while the emitter voltage remains at −48 V). After a predetermined time (defined by a first constant of RC circuit 175), transistor 180 saturates. In this embodiment, the time constant is provided by the following equation:

PT1=time constant of RC 175=(R182) (C184) where PT1 represents the time constant, RC 175 is RC circuit 175, R182 is the resistance of resistor 182, and C184 is the capacitance of capacitor 184.

The saturation of transistor 180 connects the negative terminal of power supply 108 to resistor 156 of RC circuit 145. After a second predetermined time (defined by the time constant of RC circuit 145), the voltage across coil 150b is sufficient to activate switch 150. In this embodiment, this second time constant is provided by the following equation:

PT2=time constant of RC 145=R156 ×(C158+C160) where PT2 represents the second time constant RC 145 is RC circuit 145, R156 is the resistance of resistor 156, and C158 and C160 are the capacitances of capacitors 158 and 160.

After a third period of time (defined by the time that it physically takes switch 150 to activate, typically 60 ms), switch 150 reverses the polarity of Tip and Ring terminals 102a and 102b, i.e., ring terminal 102b switches from −48 volts to ground, while tip terminal 102a switches from ground to −48 volts. The resultant "twink" is output through interface 102 to the central office, which interprets the wink as a standard response of a PBX device (although no such PBX device is actually present or otherwise connected).

Pursuant to industry standards, a minimum period of 100 ms must elapse following a line seizure before issuance of a wink. Accordingly, the time constants of RC circuits 145 and 175 (and thus the values of the capacitors and resistors which determine the time constants), are selected to delay inducing a wink for at least this period. Specifically, the wink will not trigger following a seizure until (1) transistor 180 saturates (PT1), (2) RC circuit 145 charges to a sufficient level to activate coil 150b (PT2), and (3) coil 150b physically induces the wink. Thus:

$PT1+PT2$+delay of coil 150b >100 ms

Similarly, it is desirable to turn capacitor 180 OFF at approximately the same time that the wink is triggered. To this end, capacitor 184 stops drawing current when its charge approaches a maximum value. When capacitor 169 stops drawings significant current, the lack of current flow to the base of transistor 180 shuts transistor 180 OFF.

In RC circuits, the charge of the equivalent capacitance is given by:

$$1-e^{-t/T}$$

The time period required for capacitor 169 to reach its maximum charge (approximately 98% ) is therefore provided as follows:

$$0.98=1-e^{-t/PT1}$$

Solving the above equation, the maximum charge is reached at approximately four times the time constant of RC circuit 175, i.e., 4PT1.

Similarly, capacitors 158 and 160 charge for a period equal to approximately 3PT1, i.e., the period in which transistor 180 is open (4PT1−PT1). Thus, capacitors 158 and 160 will charge to a level provided by:

$$1-e^{-3PT1/PT2}$$

When transistor 180 turns OFF, coil 150b draws current from capacitors 158 and 160, i.e., capacitors 158 and 160 discharge via the internal resistance of coil 150b. After a fourth predetermined period of time (defined by the a third time constant established by the internal resistance of coil 150b and capacitors 158 and 160), the stored charge drops below an activation value of coil 150b; switch 150 accordingly returns to its original state, terminating the wink. Since coil 150b releases only when the voltage approaches zero, the duration of the wink is given by the equations:

$$1-e^{-3PT1/PT2}=e^{-t1/PT3}$$

$e^{-t2/PT3}$=decay value wink=$t2-t1$, or wink=$-PT3(ln[\text{decay value}])+PT3(ln[1-e^{-3PT1/PT2}])$ If the WINK adaptor is designed such that RC circuit 145 charges to approximately its peak value, then the above equation can be reduced simply to:

$e^{-t2/PT3}$=decay value, or wink=$t2=-PT3(ln[\text{decay value}])$ were PT3 is the third time constant given by the equation:

$PT3=(C158+C160)\times R150b$, where R150b is the internal resistance of coil 150b, and C158 and C160 are the capacitances of capacitors 158 and 160.

Typically, coil 150b will deenergize at 2v, which represents approximately a 96% loss of the maximum 48v stored in capacitors 158 and 160. Accordingly, the typical wink will be given by the equation:

wink=$-PT3(ln\ 0.04\ )$ which is approximately 3.2(PT3).

Pursuant to industry standards, the duration of the wink must fall within 140 and 290 ms to be properly recognized. Accordingly, the values of the various resistors and capacitors noted above must satisfy the following equation:

$140<(ln[\text{decay value}])PT3\ <290$ if the decay value is 96% for the particular coil, then this reduces to approximately:

$$140 < 3.2\ PT3 < 290$$

After receiving the wink, the central office, believing that a PBX unit is operational, transmits a signal to WINK adaptor 100. The signal enters through interface 102, whereupon the DC component of the signal is eliminated by transformers 110 and 112. The resultant AC signal produced on the output side of transformers 110 and 112 (typically the audio waveform) is output to external device 500 for analysis.

Although many values may be selected for the resistors and capacitors to meet the above equations, Applicant prefers resistor 152, 156, and 182 to be 400 Ohms, 150 Ohms, and 10 K Ohms, respectively; and capacitors 158, 160, 184 to be 100 mF, 100mF, and 3.3mF, respectively. Further, switch 150 is preferably a 24 v relay with an internal resistance of 275 Ohms.

Utilizing the above values, the time constant for RC circuit 175 is 33 ms; the time constant for RC circuit 145 is 30 ms; and the time constant associated with coil 150b is 55 ms. Thus, in accordance with the above equations, the total time between the line seizure and the wink will be:

$$\text{delay}=33\text{ ms}+30\text{ ms}+60\text{ ms}=123\text{ ms}$$

This meets the minimum 100 ms industry standard delay between line seizure and wink. Similarly, the wink period is defined by:

$$\text{wink}=3.2\ (55)=177\text{ ms}$$

This period falls within the 140 ms and 290 industry standard length of a wink.

In order to improve the operation of WINK adaptor 100, several features are preferably added to the circuit, as follows.

Several preferred elements of WINK adaptor 100 are directed toward smoother operation of the circuit. For example, it is known that when switch 150 terminates the wink, the sudden swift in the magnetic field can induce a current spike in the circuit connected to coil 150b. Accordingly, a diode 168 is connected in parallel with coil 150b to suppress the effect of any such current spike.

Similarly, in order to suppress spikes in output terminals 104, zener diodes 114 and 116 are placed between Tip and Ring terminals 104a and 104b.

In order to eliminate noise in WINK adaptor 100 when inactive, capacitors 162 and 164 are placed in parallel with, power supply 108. Similarly, to eliminate noise when active (i.e. following seizure), a capacitor 166 is disposed between node 168 and ground 154. Capacitors 162, 164, and 166 are preferably 0.1 mF, 2200 mF, and 10 mF, respectively, although other such values may be used as appropriate.

Once transistor 180 turns OFF, the excess voltage stored in capacitor 184 must be discharged. This occurs through resistors 186 and 188, which are preferably 22K Ohms and a 10K variable resistor set between 5–6K Ohms.

Other preferred features of WINK adaptor 100 are directed toward convenience of use. For example, WINK adaptor 100 further preferably includes a circuit to indicate that power source 108 is active. Accordingly, an LED 200 in series with a 10 k Ohm resistor 202 are connected to the terminals of power supply 108. When power is present, LED 200 illuminates to indicate the same.

WINK adaptor 100 also preferably includes a circuit to indicate the presence of a seizure. To this end, a transistor 222 has its emitter connected to the negative terminal of power supply 108, while its collector connects to node 168 through LED 220 and 10 K Ohm resistor 228. The base of transistor 22 connects to the Tip terminal 102a through transformer 110 ans resistor 226. A resistor 224 connects the base and emitter of transistor 222. In this configuration, transistor 222 acts as a switch which turns ON during a seizure, in that the collector voltage (node 168) will be greater than the emitter voltage (−48 volts). The resultant current flow illuminates LED 220, indicating the presence of a seizure.

Further, in order to protect a portable phone connected to terminals 104 from current spikes, a resistor 118 and capacitor 120 preferably of 400 Ohms and 0.1 mF, respectively, are inserted between terminals 104a and 104b and transformers 110 and 112.

Thus, as described above, the portable WINK adaptor 100 can simulate a PBX wink in a telephone circuit, which fools a central office into believing that a PBX is present. Further, since the above adaptor can be made relatively small compared to the size of a PBX, it can be carried by an installation crew and/or repairman as part of their standard equipment.

In a second embodiment of the invention shown, WINK adaptor 100 can also be used in an FXS mode, in which the adaptor creates a dry seizure without providing power. The schematic of this embodiment is shown in FIG. 4, in which like numerals refer to like elements.

Figure 4:
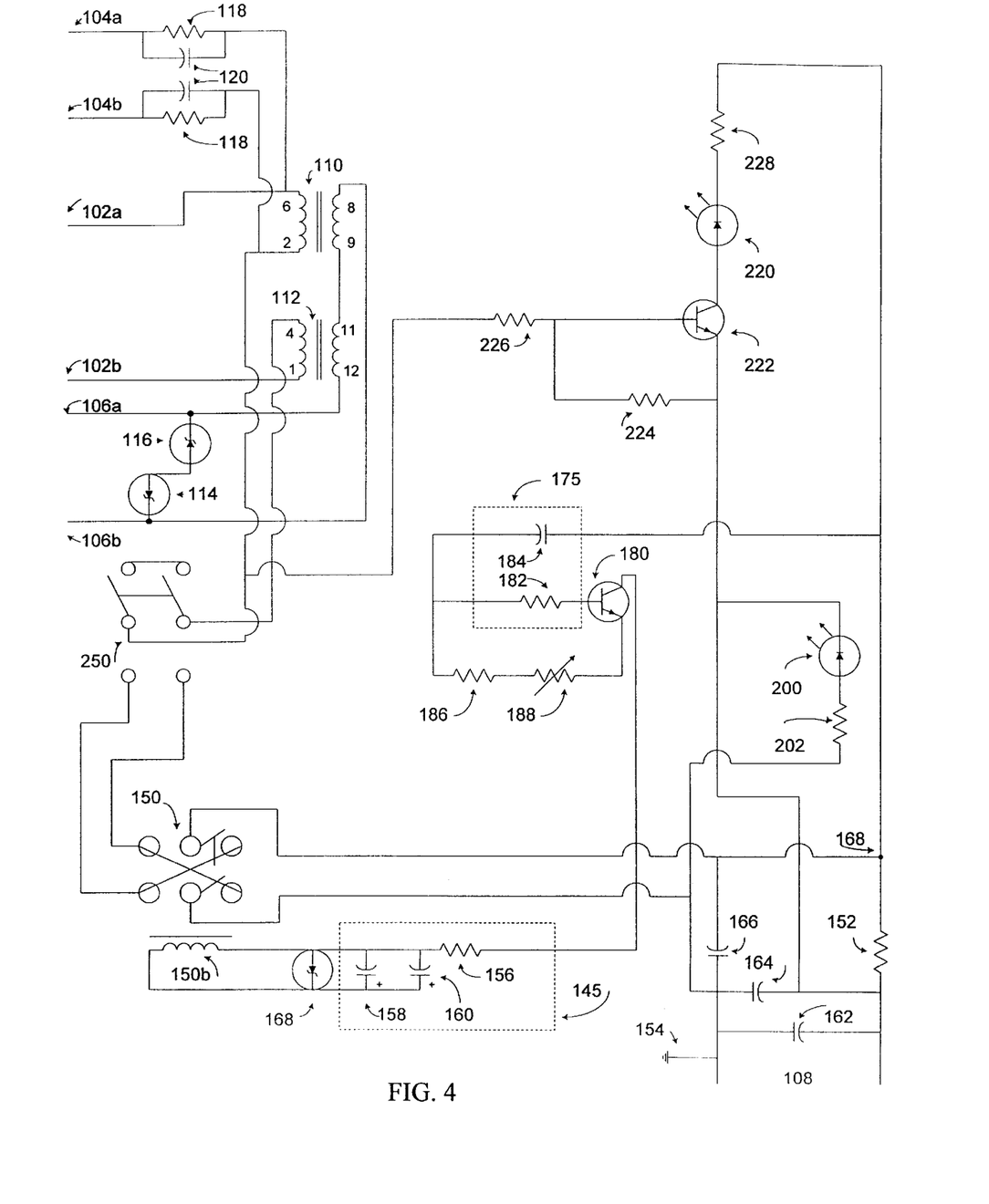
FIG. 4 is a schematic diagram of a second embodiment of the WINK adaptor.

The second embodiment of FIG. 4 is identical to that of FIG. 3, save for the provision of a switch 250 between transformer 112 and switch 150. In a DID mode, switch 250 connects the circuit in WINK adaptor 100 in the same manner as in the previous embodiment. However, when switched to FXS mode, the Tip and Ring lines are shorted, forming a circuit which consists only of terminals 102a and 102b, and transformers 110 and 112. This short acts as a dry seizure which may be utilized in repairing various stations.

While the invention has been described with reference to several exemplary embodiments, it is understood that the words which have been used herein are words of description and illustration, rather than words of limitations. Changes may be made, within the purview of the pending claims, as without effecting the scope and spirit of the invention and its aspects. While the invention has been described here with reference to particular means, materials and embodiments, the invention is not intended to be limited to the particular disclosed herein; rather, the invention extends to all functionally equivalent structures, methods and uses, such at all within the scope of the appended claims.

For example, the numerical values for the various capacitances and resistances are based on Applicant's preferred embodiments. However, any such values may be selected, so long as the delay between seizure and wink, and the duration of the wink, remain within industry standards. Similarly, the number of capacitors and resistors used in any portion of the circuit are irrelevant, provided that the total effective resistance and capacitance establish time constants which permit the circuit to operate within industry standards. To this end, the use of "RC circuit" in the specification and claims is not limited to either the values or configurations shown; but rather include any circuit having an effective resistance and effective capacitance which establishes time constraints which meet the equations provided herein.

In another example, power supply 108 is preferably a 110 AC/48 DC convertor which plugs into a wall outlet. However, other such configurations and convertors are within the scope and spirit of the invention, provided that the circuit is provided with two reference points which meet industry standards (presently −48 v and ground). Further, utilizing an independent power supply, either internal or external to WINK adaptor 100, is within the preview of the invention.

In yet another example, the approximation of 3.2 (PT3) for the delay of the wink is based upon a coil 150*b* which releases when the charge drops to 4% of its maximum value. However, based on the materials used, the value at which the coil releases may change (e.g. 2%–10%), and is given by the equations provided herein. Accordingly, while the figure of 3.2 (PT3) represents a preferred value, the invention is not limited thereto.

In yet another example, according to the preferred embodiments, test set 500 is separate from WINK adaptor 100. However, the invention is not so limited, and includes devices in which the two are combined into a single unit.

In yet another example, tranformers 110 and 112 can be substituted with a single transformer with appropriate windings. So long as the DC component is eliminated from the region, any transformer configuration can be used.

Finally, to the extent that the present invention utilizes values to meet industry standards, such standards have been known to change over time. Accordingly, any values of the various resistors and capacitors (including switch 150) which meets industry standards, either presently or as altered in the future, fall within the scope and spirit of the invention.

What is claimed:

1. An adaptor for simulating the presence of a PBX device, comprising:

first and second inputs for connection to an external line;

a relay having a coil, said relay connecting said first and second inputs to first and second voltage terminals when said coil is inactive, and inducing a wink by connecting said second and first inputs to said first and second voltage terminals when said coil is energized respectively;

a first circuit for detecting a seizure of said external line, said first circuit including at least one resistor and at least one capacitor;

a second circuit, connected to said coil, having at least one capacitor and at least one resistor;

said coil being energized to induce a wink following a delay after said external line is seized; and said relay being released to terminate said wink when a charge in said at least one capacitor of said second circuit decays below a value necessary to maintain said coil in an energized state.

2. The adaptor of claim 1, wherein said first and second circuits have first and second time constants, respectively, said delay being governed by the following equation:

$$PT1+PT2+PCoil>IND1$$

where

PT1 represents said first time constant, PT2 represents said second time constant, PCoil represents a time which said relay physically requires to induce said wink, and IND1 is a minimum time established by industry standards.

3. The adaptor of claim 2, wherein said at least one capacitor of said second circuit and an internal resistance of said relay establish a third time constant, a duration of said wink being given by the following equations:

$$IND2<wink<IND3 \quad wink=K \, (PT3)$$

where PT3 is represents said third time constant, IND2 and IND3 represent industry standards for the minimum and maximum length of a wink, and K is logarithmically proportional to a time required for said at least one capacitor of said second circuit to discharge from its peak charged value.

4. The adaptor of claim 1, further comprising an indication circuit, connected between said first and second voltage terminals, which indicates when said first and second voltage terminals are connected to a power source.

5. The adaptor of claim 1, further comprising a seizure detector circuit which indicates when said external line is seized.

6. The adaptor of claim 1, further comprising first and second outputs capable of relaying signals from said external line to a testing device, said first and second outputs being coupled to said first and second inputs through at least one transformer.

7. The adaptor of claim 1, further comprising a connector which connects to a portable telephone, said connector being coupled to said first and second inputs.

8. The adaptor according to claim 3, wherein IND1 is 100 ms, IND2 is 140 ms, IND3 is 290 ms, and K is approximately 3.2.

9. The adaptor according to claim 3, further comprising a switch which selectively shorts said first and second inputs.

10. An adaptor for simulating the presence of a PBX device, comprising:

first and second inputs for connection to an external line;

a relay having a coil, said relay connecting said first and second inputs to a ground and a negative voltage when said coil is inactive, and inducing a wink by connecting said second and first inputs to said ground and said negative voltage when said coil is energized;

a transistor having an emitter connected to said negative voltage, and a base connected to said negative voltage through a first RC circuit and at least one resistor;

said coil being connected to a second RC circuit; and a collector of said transistor being connected to said second RC circuit.

11. The adaptor according to claim 10, further comprising a switch which selectively shorts said first and second inputs.

12. An adaptor for simulating the presence of a PBX device, comprising:

first and second inputs for connection to an external line;

a relay having a coil, said relay connecting said first and second inputs to first and second voltage terminals when said coil is inactive, and inducing a wink by connecting said second and first inputs to said first and second voltage terminals when said coil is energized respectively;

a first circuit for detecting a seizure of said external line, said first circuit including at least one resistor and at least one capacitor;

a second circuit, connected to said coil, having at least one capacitor and at least one resistor;

said coil being energized to induce a wink following a delay after said external line is seized;

said relay being released to terminate said wink when a charge in said at least one capacitor of said second circuit decays below a value necessary to maintain said coil in an energized state;

said first and second circuits having first and second time constants, respectively, said delay being governed by the following equation:

$$PT1+PT2+PCoil>IND1$$

said at least one capacitor of said second circuit and an internal resistance of said relay establishing a third time constant, a duration of said wink being given by the following equations:

$$IND2<wink<IND3 \quad wink=K(PT3)$$

said first circuit including a transistor, said transistor being ON during a period between saturation of said transistor and when said at least one capacitor of said first circuit approaches a maximum charge, and wherein said peak charged value is based on said period; and where:

PT1 represents said first time constant, PT2 represents said second time constant, PCoil represents a time which said relay physically requires to induce said wink, PT3 represents said third time constant, IND1 is a minimum time established by industry standards, IND2 and IND3 represent industry standards for the minimum and maximum length of a wink, and K is logarithmically proportional to a time required for said at least one capacitor of said second circuit to discharge from its peak charged value.

13. An adaptor for simulating the presence of a PBX device, comprising:

first and second inputs for connection to an external line;

a relay having a coil, said relay connecting said first and second inputs to a ground and a negative voltage when said coil is inactive, and inducing a wink by connecting said second and first inputs to said ground and said negative voltage when said coil is energized;

a transistor having an emitter connected to said negative voltage, and a base connected to said negative voltage through a first RC circuit and at least one resistor;

said coil being connected to a second RC circuit;

a collector of said transistor being connected to said second RC circuit;

said transistor saturating responsive to a short of said first and second inputs to turn said transistor ON;

said second RC circuit charging responsive to said transistor turning ON;

said coil energizing responsive to said second RC circuit reaching a predetermined level of charge;

said transistor turning OFF when a charge of said first RC circuit approaches a maximum value;

said second RC circuit discharging current through said coil responsive to said transistor turning OFF; and said coil returning to an inactive state when a charge of said second RC circuit drops below a predetermined value.

14. The adaptor of claim 13, wherein said first and second RC circuits have first and second time constants, respectively, and said coil induces a wink after an elapsed time following said short, said elapsed time being governed by the following equation:

$$PT1+PT2+PCoil>100ms$$

where PT1 represents said first time constant, PT2 represents said second time constant, and PCoil represents a time which said relay physically requires to induce said wink.

15. The adaptor of claim 13, wherein said at least one capacitor of said second circuit and an internal resistance of said relay establish a third time constant, a duration of said wink being given by the following equations:

$$140ms<wink<290ms \quad wink=K(PT3)$$

where PT3 represents said third time constant, and K is logarithmically proportional to the time required for said at least one capacitor of said second circuit to discharges below said predetermined value.

16. The adaptor of claim 13, further comprising a seizure detector circuit which indicates when a seizure occurs on said external line.

17. The adaptor of claim 13, further comprising first and second outputs capable of relaying signals from said external line to a testing device, said first and second outputs being coupled to said first and second inputs through at least one transformer.

18. The adaptor of claim 13, further comprising a connector which connects to a portable telephone, said connector being coupled to said first and second inputs.

* * * * *